UNITED STATES PATENT OFFICE 2,285,059

PROCESS FOR PREPARING ALDEHYDES

John T. Scanlan and Daniel Swern, Washington, D. C., assignors to Henry A. Wallace, as Secretary of Agriculture of the United States of America, and to his successors in office No Drawing. Application November 2, 1939, Serial No. 302,602

2 Claims. (Cl. 260—601)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

Our invention relates to a new and more advantageous process for preparing simultaneously two or more aldehydes from unsaturated fatty acids which contain three or more carbon atoms, their esters, including the glycerides, the corresponding alcohols and suitable derivatives and substitution products of any of the above. To be suitable for use in this process, the unsaturated fatty acid, ester, alcohol or derivative thereof must contain one or more ethylenic linkages (—CH=CH—). Raw materials which have this characteristic are the extremely cheap and abundant fats and fatty oils of both animal and vegetable origin, for example, lard or lard oil, cottonseed oil, peanut oil, olive oil, castor oil, etc., and the fatty acids, esters, and alcohols which can be derived from them. The application of this invention is not, however, limited to naturally-occurring compounds or their derivatives, but may also be applied to any similarly constituted compounds, whatever their source.

The products obtained contain at least one aldehyde group, but may also have another functional group, such as an aldehyde, ketone, carboxyl, hydroxyl or ester group elsewhere in the molecule. The nature and location of the other group or groups will depend upon the structure of the starting material. These products are of technological importance because the highly reactive aldehyde group lends itself so well to further chemical reaction. Aldehydes can be oxidized to acids or reduced to alcohols. They readily undergo addition and condensation to form acetals, cyanhydrins, dioxolanes, imines, oximes and hydrazones. They react with themselves to form esters, aldols and polymers. They are useful raw materials in the manufacture of such products as perfumes and flavors, rubber accelerators, certain pharmaceuticals and synthetic resins. The acids and alcohols derived from them are suitable for use in the preparation of perfumes and flavors, plasticizers, rubber-like materials, artificial silks, etc.

This invention, therefore, has as its objective a new and more advantageous method of treating unsaturated fatty acids, their esters including the glycerides, and the related alcohols, which contain three or more carbon atoms, and one or more ethylenic linkages (—CH=CH—) so as to convert these groups to alpha-glycol groups, which consist of two unsubstituted hydroxyl groups attached to adjacent carbon atoms, thus,

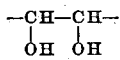

and subsequently, with or without isolation of these hydroxylated compounds from the reaction mixture, to split the aliphatic chain at one or more of these glycol linkages into two or more fragments, each of which contains one or two aldehyde groups.

The object of this invention is accomplished by first hydroxylating the unsaturated fatty acid, alcohol, glyceride or other ester with 30% hydrogen peroxide in glacial acetic acid. The conversion of the ethylenic linkage to the alpha-glycol group is shown by the following equation:

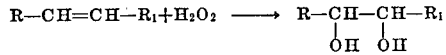

The established method of carrying out this reaction is to mix all three ingredients together and to allow the reaction to proceed at room temperature or alternatively to heat the mixture on the steam bath, with occasional agitation in both cases, because there is a separation into layers when the materials are first mixed. If heat is not applied, the reaction requires about a week for completion. If heat is applied, the reaction proceeds very slowly until the temperature approaches closely to that of the steam bath, and then suddenly reacts very rapidly. Since the reaction is strongly exothermic, the mixture heats up rapidly, and boils violently even though removed from the heating bath. This makes it very difficult to control the temperature of large batches. It has also been reported by other investigators that there is more acetylation of the hydroxyl groups at high temperatures, and since acetylation interferes with the scission step in our process, high reaction temperatures are undesirable. Temperatures near the boiling point of the reaction mixture are also undesirable because they cause rapid decomposition of the hydrogen peroxide.

We have discovered that if the glacial acetic acid and 30% hydrogen peroxide are mixed together and heated at 80–85° C. for about one hour, and then cooled to room temperature, and the unsaturated fatty acid, alcohol, glyceride or other ester is then added, and the mixture agitated occasionally, the reaction begins to proceed rapidly at room temperature, and is completed within a few hours, instead of consuming a week or more as is the case under present methods. Under the conditions of our process the temperature is easily controlled and kept within suitable bounds. The means necessary to accomplish this depend, of course, upon the size and nature of the reaction vessel. For batches of the size hereinafter described no external cooling was necessary.

The next step of our process is accomplished by treating the product of the above hydroxylation, in acetic acid solution, with one equivalent (plus a slight excess) of red lead, $Pb_3O_4$, for each pair of hydroxyl groups. The red lead reacts with the acetic acid to form lead tetraacetate which reacts, as rapidly as it is formed, with the compounds containing the alpha-glycol groups splitting the chain between the two adjacent carbons to which the hydroxyl groups are attached, yielding aldehydes as shown by the following equations:

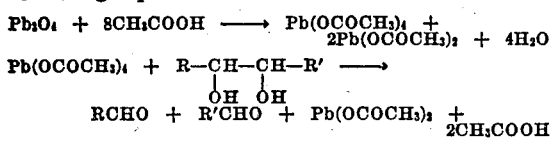

This second step of the reaction may be carried out without isolating the hydroxylated product by merely adding to the hydroxylation reaction mixture the required additional quantity of glacial acetic acid, and then adding the red lead in small portions. The active agent in the reaction is lead tetraacetate, but this procedure makes it unnecessary to isolate and purify that unstable compound, which heretofore has been the practice. The excess hydrogen peroxide present does not interfere, as it is decomposed first by the red lead before any of the latter reacts with the hydroxy compounds to form aldehydes.

The yield of aldehydes can be increased if the hydroxylation product is isolated and heated with excess aqueous alkali. This treatment hydrolyzes the acetyl groups, some of which are always formed when acetic acid is employed in the hydroxylation. Since lead tetraacetate, which is the active agent in this reaction, does not react with the glycol group, if either of the two adjacent hydroxyl groups is substituted, the removal of these acetyl groups is necessary to obtain a maximum yield. However, in those cases where the starting material is a glyceride, or other ester, this treatment may be omitted, since the ester groups would also be hydrolyzed, and it is often advantageous to preserve this group, as its presence facilitates the oxidation of that fraction to the corresponding acid when certain oxidizing agents are used.

The volatile products, such as pelargonic aldehyde and alpha-nonenaldehyde are readily recovered by steam distillation and further purified by washing with dilute alkali and water with subsequent drying and distillation, if desired. The non-volatile material can be recovered by extraction with an immiscible solvent, or by mechanical separation, from the steam distillation residue, and can be then further purified by suitable means, or subjected to further chemical treatment. For example, the glyceride of the half-aldehyde of azelaic acid can be oxidized, or reduced, and then saponified, yielding azelaic acid, or 9-hydroxypelargonic acid, respectively. Acetic acid and lead acetate are recoverable from the residues. Glycerol is also recoverable when a glyceride is used as the starting material.

The following examples serve to illustrate the conditions for preparing our product:

*Example 1*

1800 cc. of glacial acetic acid and 567 grams of 30% hydrogen peroxide were mixed together and heated on the steam bath at approximately 85° C. for one hour. The solution was then cooled to about 25° C. and added to 706 grams of oleic acid. With occasional agitation the ensuing exothermic reaction was allowed to proceed without application of heat. In 40 minutes the temperature had risen to 65° C. and at that temperature the oily layer disappeared and the solution very quickly became homogeneous and clear. The temperature then began to fall very slowly and the mixture was allowed to stand over night at room temperature. It was filtered cold to remove a small quantity of a waxy solid, poured into 6000 cc. of hot $H_2O$, and the aqueous layer was siphoned off and rejected. The residual oil was dissolved in 750 cc. of 6N NaOH and 4000 cc. of water and heated two hours on the steam bath. It was then heated to boiling, removed from the heat and made acid with 6N HCl. The oil thrown out of the hot solution solidified on cooling, was separated from the aqueous layer, remelted and thoroughly washed with about 3000 cc. of boiling water. The mixture was allowed to cool, the solidified product separated, dried for a day over anhydrous calcium chloride and recrystallized from alcohol. Yield 353 grams of 9,10-dihydroxystearic acid; M. P., 89–90° C., neutral equivalent, 316.4 (theory 316.3).

63 grams of this purified 9,10-dihydroxystearic acid were dissolved in 500 grams of glacial acetic acid at 55°–65° C. Maintaining the temperature within that range, 151 grams of finely powdered, ordinary red lead ($Pb_3O_4$) were added in small portions. Each successive portion was added only after the previous one had been completely decolorized. When all the red lead had been added, the solution was diluted with 500 cc. of water and steam distilled. The pelargonic aldehyde, a colorless oil, was separated from the distillate mechanically, or by extraction with an immiscible solvent, such as ether, washed with dilute alkali, then with water and dried. The yield was about 20 grams, 70% of theory based upon dihydroxystearic acid, 31.5% based upon oleic acid. The residue from the steam distillation was extracted with an immiscible solvent, such as ether, the solution washed with water until free from lead and dried. Evaporation of the solvent yielded a pale yellow oil, the half-aldehyde of azelaic acid. The yield was about 22 grams, 64% of theory.

*Example 2*

Dihydroxystearic acid was prepared by hydroxylating 282 grams of oleic acid exactly as described in Example 1, except that the final recrystallization from alcohol was omitted. The product after being air-dried weighed 288 grams. This material was dissolved in 2200 cc. of glacial acetic acid, heated to 55–65° C. and while maintaining the temperature within that range, 754 grams of red lead ($Pb_3O_4$) were added in small portions. When the reaction was complete the reaction mixture was diluted with 1500 cc. of water and steam distilled. The pelargonic aldehyde was separated from the distillate by extraction with ether, and purified by washing with water, sodium bicarbonate solution, again with water, and then dried over anhydrous calcium sulfate. The ether was removed by evaporation under reduced pressure. Yield 51 grams of pelargonic aldehyde, or 36% of theory, based on the oleic acid used.

The steam distillation residue was extracted with ether, washed free of lead with water, the ether was removed by evaporation under reduced pressure, and the residue was dissolved in sufficient 5% sodium hydroxide to give a solution of pH 8-9. A solution of 92 grams of potassium permanganate in 1100 cc. of water was added at room temperature as rapidly as possible to this alkaline solution with vigorous agitation, but with care to prevent loss by foaming. The temperature of the mixture rose rapidly to about 70° C. The stirring was continued until fifteen minutes after the disappearance of the permanganate color. After standing over night the manganese dioxide was removed by filtration, washed thoroughly with boiling water, and the combined filtrate and washings were acidified with sulfuric acid and chilled in the refrigerator. The small quantity of oil, which separated on acidification, solidified and was easily removed mechanically. The crystals of azelaic acid which also separated on cooling were redissolved by heating the solution on the steam bath and the solution was concentrated to about two liters, boiled a short time with a small quantity of Darco and then cooled in the refrigerator. The crystals of azelaic acid were filtered and washed, and recrystallized from water. Yield 11 grams, 6% of the theory, based on oleic acid used. M. P. 104–106° C.

Example 3

720 cc. of glacial acetic acid and 225 grams of 30% hydrogen peroxide were mixed and heated for one hour at 80–85° C. The mixture was cooled to 25° and 282 grams of oleic acid were added to it at that temperature. The ensuing exothermic reaction was allowed to proceed with occasional agitation. In 30 minutes the temperature had risen to 65° C. and the solution was homogeneous. After about 15 minutes the temperature began to fall slowly. After standing over night this reaction mixture was diluted with 1480 cc. of glacial acetic acid, heated to 55–65° C. and 754 grams of finely powdered red lead were added in small portions. When a test indicated that the oxidizing agent was exhausted the mixture was steam distilled. The pelargonic aldehyde was extracted from the distillate with ether. The ether solution was washed with water, saturated sodium bicarbonate solution, again with water, dried over anhydrous calcium sulfate, filtered and the ether removed by evaporation. Yield 33 grams, 23% of theory. About 234 grams of dark brown oil was obtained by extracting the steam distillation residue. No feasible method was developed for the recovery of the azelaic half aldehyde or azelaic acid from this mixture.

Example 4

720 cc. of glacial acetic acid and 225 grams of 30% hydrogen peroxide were mixed and heated for one hour at 80–85° C. The solution was cooled to 25° C. and 310 grams of ethyl oleate were added. The mixture was agitated occasionally and in the course of an hour the temperature rose to 61° C. but the mixture did not become homogeneous. An additional 400 cc. of glacial acetic acid was heated to 60° C. and added which gave a clear, homogeneous solution. After the solution had stood over night, 1080 cc. of glacial acetic acid were added, and the solution was heated to 55–65° C. 754 grams of finely powdered red lead were added in small portions while the temperature of the reaction mixture was held at 55°–65° C. The clear solution was diluted with 1000 cc. of water and steam distilled. The distillate was extracted with ether, the ether solution was washed twice with water, then with sodium bicarbonate solution and again with water until neutral. The ether solution was dried over anhydrous calcium sulfate, filtered, and the ether removed by evaporation. Yield of pelargonic aldehyde, 47 grams, 33% of theory. The steam distillation residue was extracted with ether. This ether solution was treated in the same manner as was the ether extract of the distillate. The residue was vacuum distilled. Yield of the pure ethyl ester of azelaic half aldehyde, 25 grams, 12.5% of theory.

Example 5

Both the high-melting and low-melting forms of the ethyl ester of dihydroxystearic acid were prepared by esterifying with ethyl alcohol, the crude dihydroxystearic acids obtained by hydroxylating oleic acid with potassium permanganate in aqueous alkaline solution, and 30% hydrogen peroxide in acetic acid solution, respectively. In the subsequent treatment no difference was observed in the behavior of the two forms of the ester. 69 grams of ethyl-9,10-dihydroxystearate were treated with red lead in exactly the same manner as 9,10-dihydroxystearic acid was treated in Example 1. Pelargonic aldehyde was recovered as a colorless oil from the steam distillate. The yield was 25 grams, 88% of theory. The residue yielded about 33 grams, 83% of theory, of pale yellow oil, the ethyl ester of the half-aldehyde of azelaic acid.

Example 6

225 grams of 30% hydrogen peroxide and 820 cc. of glacial acetic acid were mixed and heated for one hour at 80°–85° C. The solution was cooled to 25° C. and mixed with 311 grams of castor oil. The mixture was agitated occasionally and the temperature rose to 66° C. in about 30 minutes becoming homogeneous at about 59° C. The temperature began to fall slowly and the solution was stirred mechanically about two hours and allowed to cool to room temperature. An additional 1380 cc. portion of glacial acetic acid was added, the solution was heated to 55°–65° C. and 754 grams of finely powdered red lead were added in small portions. When the reaction was complete the mixture was steam distilled, and the distillate was extracted with ether. The ether solution was washed with water, sodium bicarbonate solution and again with water, dried with anhydrous calcium sulfate, and evaporation of the ether yielded 47 grams of alpha-nonenaldehyde.

The residue was extracted with ether, the ether solution was washed free of lead, and the ether evaporated. The residual oil was dissolved in 1000 cc. of glacial acetic acid and 225 grams of 30% hydrogen peroxide were added. The mixture was allowed to stand about 24 hours then heated on the steam bath until the temperature stopped rising and then removed. The acetic acid was distilled off with steam, the supernatant aqueous layer was poured off and the residue was neutralized with 25% sodium hydroxide solution.

The mixture was refluxed three hours with a 1000 cc. excess of 6N NaOH. It was then acidified with sulfuric acid while hot, and the aqueous layer was immediately removed by filtration. The filtrate was boiled with a small portion of "Darco" (a decolorizing charcoal) to remove the small quantity of oil which came through the filter, filtered hot and allowed to cool. The azelaic acid separated as small, white crystals. Yield about 26 grams.

Having thus described our invention, what we claim for Letters Patent is:

1. The process for preparing aldehydes, which comprises reacting unsaturated higher fatty acids containing substantially eighteen carbon atoms and an ethylenic linkage, and esters of such acids wherein the acid radical is linked to one of a group consisting of ethyl and glyceryl with a mixture of glacial acetic acid and 30% hydrogen peroxide solution, which mixture has been previously heated for substantially one hour at a temperature ranging from 80° C.–85° C. and cooled to substantially 25° C.; permitting the ensuing exothermic reaction to go to completion with occasional agitation and without the application of heat; then adding to the reaction mixture sufficient glacial acetic acid so that the total quantity present is sufficient to react with the red lead subsequently added; then maintaining the diluted mixture at a temperature ranging from 55° C.–65° C. and treating it with substantially one molecular weight of red lead for each alpha-glycol linkage present; and, then subjecting the mixture to the action of steam distillation, thereby separating the volatile and non-volatile aldehydes produced.

2. The process for preparing aldehydes, which comprises reacting unsaturated higher fatty acids containing substantially eighteen carbon atoms and an ethylenic linkage, and esters of such acids wherein the acid radical is linked to one of a group consisting of ethyl and glyceryl with a mixture of glacial acetic acid and 30% hydrogen peroxide solution, which mixture has been previously heated for substantially one hour at a temperature ranging from 80° C.–85° C. and cooled to substantially 25° C.; permitting the ensuing exothermic reaction to go to completion with occasional agitation and without the application of heat; then separating the crude hydroxylated derivative from the mixture; then subjecting it to the action of heat in the presence of sodium hydroxide, thereby freeing the hydroxyl groups acetylated in the reaction; then dissolving the hydroxylated derivative in excess glacial acetic acid; then adding red lead, the while maintaining the temperature between 55° C.–65° C.; and, then subjecting the mixture to the action of steam distillation, thereby separating the volatile and non-volatile aldehydes produced.

JOHN T. SCANLAN.
DANIEL SWERN.